Oct. 30, 1945.   C. W. HANSELL   2,388,052
SIGNALING
Filed April 18, 1941   5 Sheets-Sheet 1

INVENTOR
C. W. HANSELL
BY
ATTORNEY

Oct. 30, 1945.   C. W. HANSELL   2,388,052
SIGNALING
Filed April 18, 1941   5 Sheets-Sheet 2

INVENTOR
C. W. HANSELL
BY
ATTORNEY

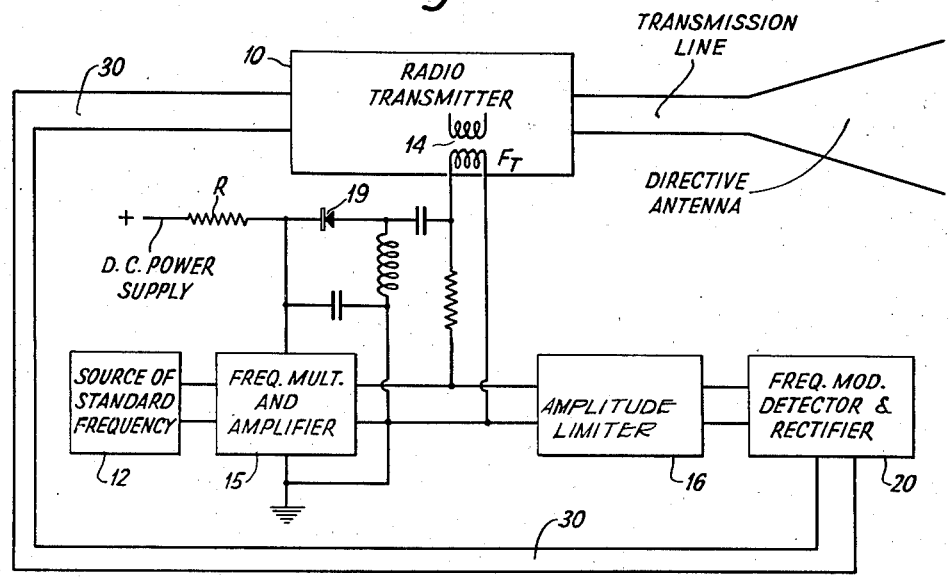
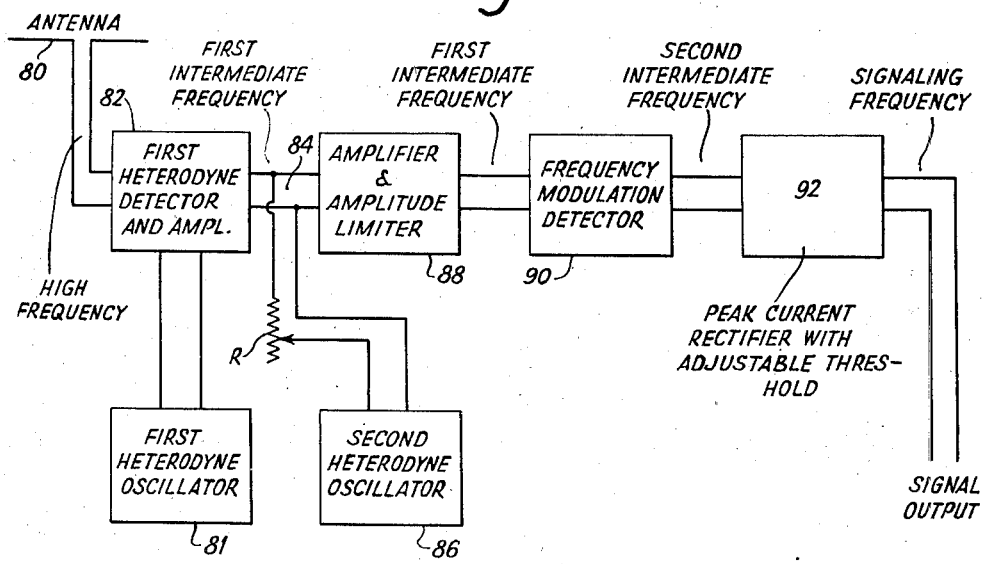

Oct. 30, 1945.  C. W. HANSELL  2,388,052
SIGNALING
Filed April 18, 1941  5 Sheets-Sheet 4
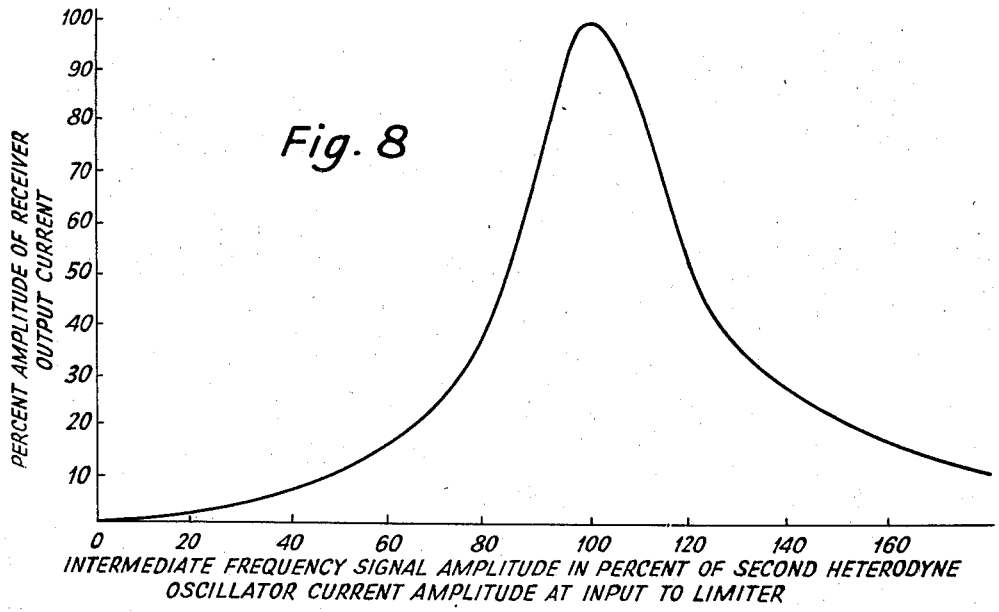
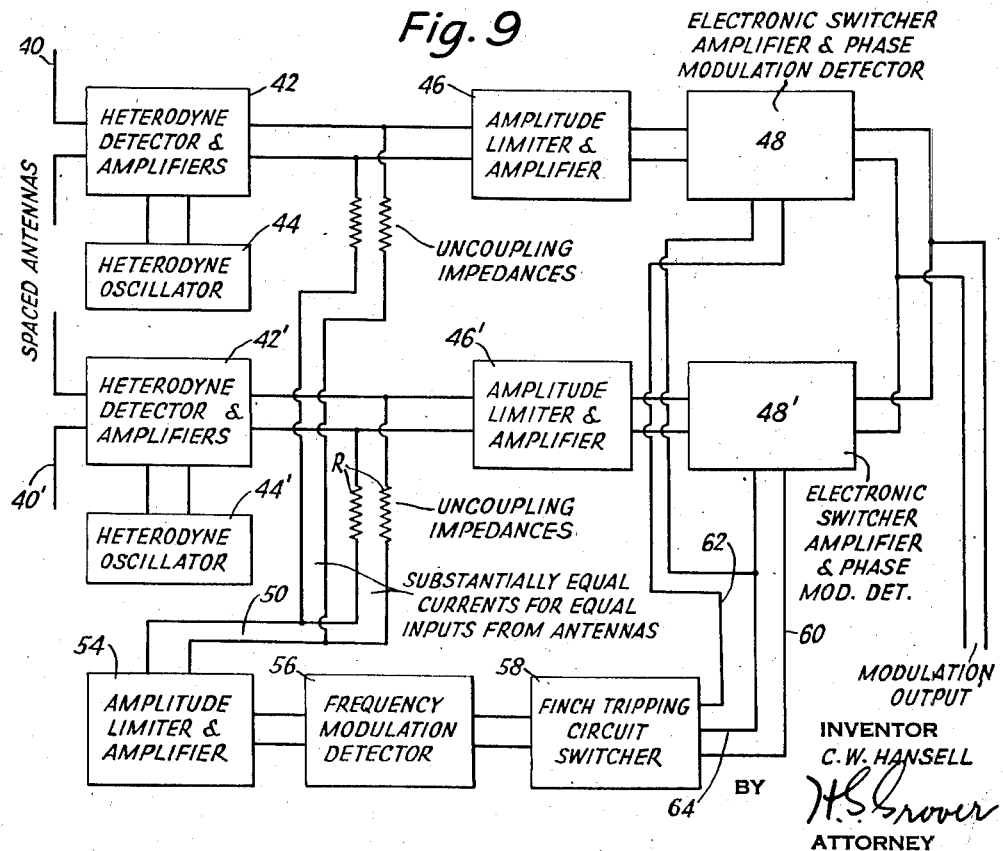
INVENTOR
C. W. HANSELL
BY
ATTORNEY Oct. 30, 1945.  C. W. HANSELL  2,388,052
SIGNALING
Filed April 18, 1941  5 Sheets-Sheet 5

INVENTOR
C. W. HANSELL
BY
H. G. Grover
ATTORNEY

Patented Oct. 30, 1945

2,388,052

UNITED STATES PATENT OFFICE 2,388,052

SIGNALING

Clarence W. Hansell, Port Jefferson, N. Y., assignor to Radio Corporation of America, a corporation of Delaware Application April 18, 1941, Serial No. 389,161

30 Claims. (Cl. 250—20)

This application concerns signaling methods and means and makes use of an amplitude limiter to which is applied two currents of approximately equal amplitudes which are different in frequency. The resultant current at the output of the limiter is of a frequency which, most of the time, lies between the frequencies of the two currents but which momentarily changes frequency when the two currents are passing through the condition of opposed phase or polarity. This change in frequency is in a direction toward and past the frequency of the stronger current. These principles of operation are made use of in accordance with my invention for signaling purposes.

An amplitude limiter as defined for the purposes of this patent application is any device which removes substantially all variation in strength or amplitude of alternating currents passed through it but leaves substantially all variations in phase or frequency of the currents undisturbed, within a required frequency band. A number of devices capable of use as amplitude limiters are already well known in the art and it appears likely that many other devices have been or will be devised to accomplish limiting.

When two currents of different frequency $f_1$ and $f_2$ but of substantially equal amplitudes $V_1$ and $V_2$ are passed through an amplitude limiter the resulting current coming from the limiter is a current at a frequency $f_3$ approximately half way between the frequencies of the two input currents but this constant frequency output current suffers a substantially instantaneous phase reversal each time the two input current components are passing through the condition of opposing phase. This is equivalent to saying that the output current from the limiter is at a frequency about half way between the two input frequencies except for very great momentary frequency shifts which take place at the instant of opposing phase of the two input currents. If the two input currents are slightly different in amplitude the momentary large frequency shift will be in a direction from the average frequency toward and through the frequency of the stronger input current. If the relative magnitude of the two input currents is reversed the direction of the momentary frequency shift is reversed. Consequently an extremely small change in relative amplitudes of the two input currents around the condition of equality will reverse the direction of the large peak frequency shifts.

A broad object of my invention is improved comparison of the relative amplitudes of two currents of different frequency and of slightly different and relatively varying amplitudes.

A second broad object of my invention is improved comparison of the relative frequencies of two currents of about like amplitudes one or both of which currents may be of relatively varying phase or frequency.

A further object of my invention is improved comparison of the relative frequencies or relative amplitudes of two currents as described above and improved indication of the said relations.

A somewhat more detailed object of my invention is improved comparison of currents of the nature described above one of which, for example, represents signals to be transmitted and the other of which, for example, is of constant frequency and improved detection of any relative variations in frequency of the said one current representing signals to be transmitted, and improved stabilization of the mean frequency of said current representing signals in accordance with the components derived by the detecting operation.

A further somewhat detailed object of my invention is use of the broad principle outlined above in side band signaling systems for comparing currents representing the side band signals and producing pulses which occur at the times of zero envelope amplitude of the double side band currents and to use said pulses and the side bands from which the same are derived to create a new and strong carrier to replace the suppressed carrier in a demodulator excited by the said side bands.

A still further detailed object of my invention is to utilize the principle described briefly hereinbefore to compare the amplitude of carrier current telegraphy signals (continuous or interrupted) passed by a line amplifier with currents of constant amplitude and to use the detected amplitude variations to control the amplifier gain to supply at the line amplifier output currents representing telegraphy signals of good amplitude.

An additional object of my invention is use of the principle described above to improve selection of the best of two or more signals as used in a diversity receiver system.

In describing my invention in detail reference will be made to the attached drawings wherein:

Figure 6 is a modulated wave transmitter with means for stabilizing the frequency of the transmitted wave and for automatically maintaining the relative amplitudes of the two currents supplied to the limiter as desired;

Figure 7 shows an amplitude modulated wave receiver using the novel features of my invention;

Figure 8 is a curve showing the characteristics of the receiver of Figure 7;

Figure 9 shows a diversity receiver arranged in accordance with my invention;

Figure 10 illustrates a carrier suppressed double side band receiver arranged in accordance with my invention; while

Assume now that, in the input to a substantially perfect limiter, we apply two alternating currents of nearly equal amplitude. From the output of the limiter we then obtain a current at a carrier or center frequency current equal to that of the stronger input current and this carrier frequency current will be phase or frequency modulated due to the other input current.

Figure 3:
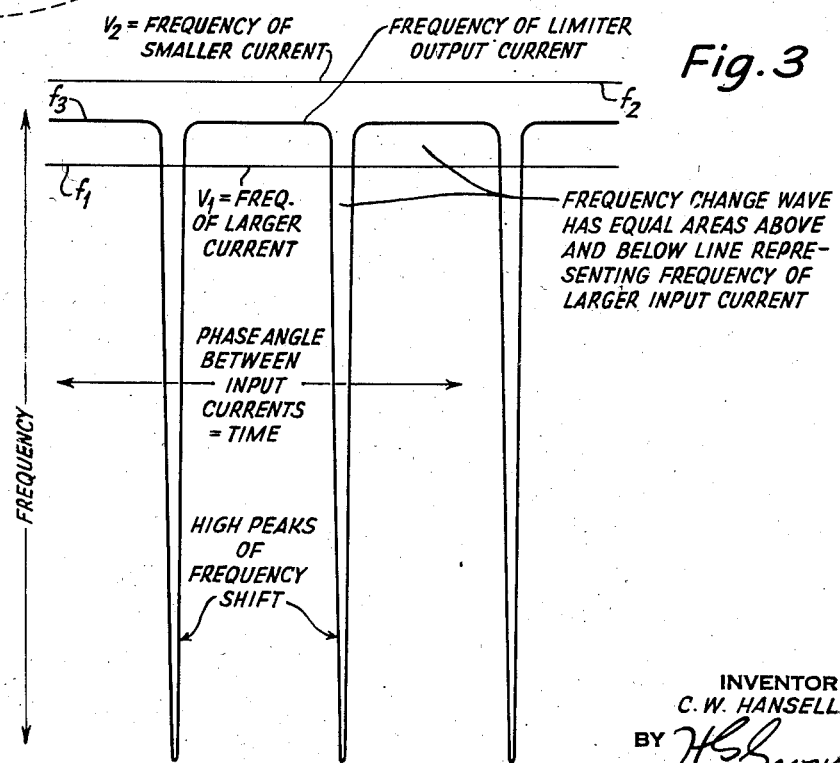
Figure 3 is a curve showing the relation of the frequencies of the two currents and of the resultant current and variations of the latter when the phases of the two currents change.

If one of the currents had been much weaker than the other then the wave form of frequency variation modulation of the stronger current by the weaker current would have been sinusoidal. However, in this case where the currents are nearly equal, the wave form of frequency modulation of the stronger current by the weaker current is far from sinusoidal. Instead it is characterized by a long flattened portion of one polarity and a short, sharply peaked portion of the opposite polarity. Such a wave form is illustrated in Figure 3 where $V_1$ is the stronger current and $V_2$ is the weaker current.

Figure 1:
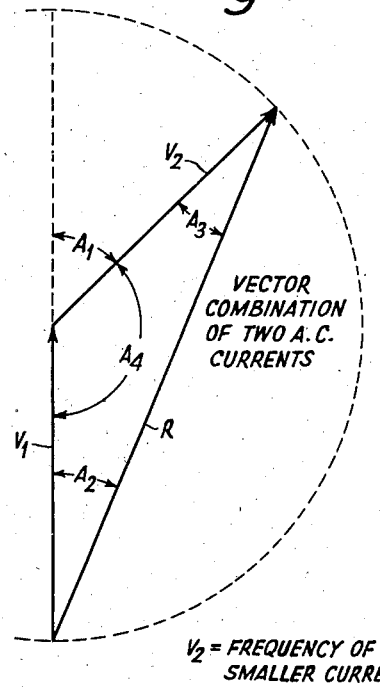
Figure 1 is a vector diagram showing the phase relation of two currents of different frequency and of the resultant obtained by combining the said two currents.

In Figure 1 of the attached drawings I have shown a vector diagram which may be used to determine the wave form of the carrier current phase variation for the assumed case of nearly equal (but not equal) input currents.

In the diagram $V_1$ represents the amplitude of the stronger input current $f_1$ and $V_2$ the amplitude of the weaker input current $f_2$. They form a resultant amplitude of input current $R$ of frequency $f_3$ which varies in phase with respect to the stronger input current $V_1$.

Referring to the diagram of Figure 1 the angle $A_1$ represents the instantaneous difference in phase between the two input currents. This angle $A_1$ is equal to $2\pi f_0 +$ where $f_0$ is the difference between the frequencies $f_1$ and $f_2$ of the stronger and weaker input currents respectively. Since the angle varies in direct proportion to time I will use the value of the angle $A_1$ as my measure of time in plotting the wave form of phase variation of the resultant current $R$.

Figure 2:
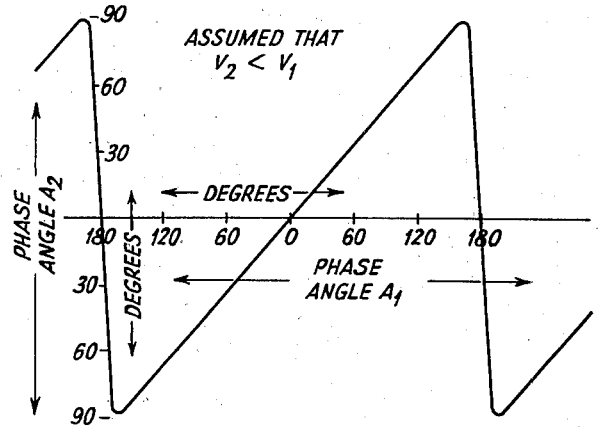
Figure 2 is a curve obtained by plotting the phase of the resultant as a function of the angular relation of the two currents.

From trigonometry, when $V_2$ is almost equal to $V_1$ it is apparent that the angle $A_2$ is almost equal to half the angle $A_1$. (Both angles subtended by the same arc.) Therefore, the angle of phase variation of the resultant current $R$ with respect to the current $V_1$, over large ranges of the angle $A_1$, and for the greater part of a cycle of the phase modulation beat, varies in direct proportion to the angle $A_1$, that is, the phase variation is directly proportional to time. In Figure 2 the wave form of the phase variation of $A_1$ and $A_2$ is shown. When the resultant current varies phase in direct proportion to time this is equivalent to saying that the resultant current has a nearly fixed or nearly constant difference in frequency from the frequency of the stronger input current $V_1$.

However, a curious thing happens at the instant the two input currents pass through the condition of opposing phase. At this instant the phase or polarity of the resultant current $R$ suddenly reverses. This sudden phase reversal is equivalent to a sudden and momentary very great change in frequency.

As shown qualitatively in Figure 3, when two nearly equal input currents $f_1$ and $f_2$ are applied to the input of the limiter the resulting output current $f_3$ is at a nearly constant frequency except for momentary very great frequency shift pulses repeated once per cycle of the difference frequency.

The value of the limiter output frequency, between frequency shift pulses, is not at the frequency of the stronger input current but is at a frequency $f_3$, close to half way between the frequencies of the two input currents. It is apparent that the amplitude of the frequency shift pulse, and its direction, are such that the mean or carrier wave output frequency from the limiter is equal to the frequency $f_1$ of the stronger input current. Therefore, the short high pulse of frequency change in the limiter output current must be in a direction away from the frequency of the weaker input current toward and through the frequency of the stronger input current to the limiter.

A mathematical analysis of the phenomena obtained when the two currents of nearly equal amplitudes are applied to an amplitude limiter has been made and the conclusions reached are substantially identical with those reached by reasoning with the use of graphical analysis.

According to this mathematical analysis the peak frequency deviation D of the current in the output of the limiter is equal to the sum of the amplitudes of the input currents divided by their difference times half the difference between the frequencies of the two input currents. Stating this in my own symbols:

$$D = \frac{V1 + V2}{V1 - V2} \times \frac{f2 - f1}{2}$$

where $V1$ = amplitude of the stronger input current
$V2$ = amplitude of the weaker input current
$f1$ = the frequency of one of the input currents
$f2$ = the frequency of the other input current This may be written:

$$D = \frac{V1 + V2}{2(V1 - V2)} \times (f2 - f1)$$

Figure 4:
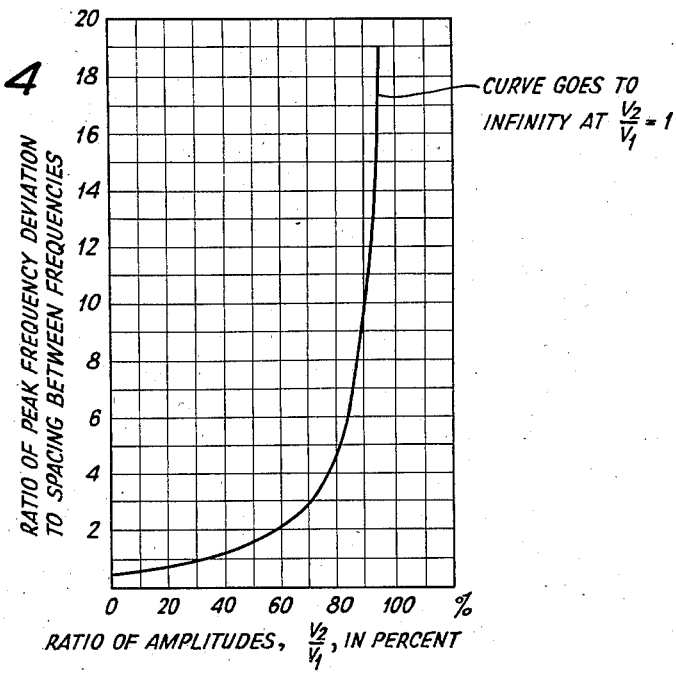
Figure 4 is a curve showing the frequency deviation of the resultant as a function of the ratio of the voltage of the weaker current to the stronger current.

Values of $$\frac{V1 + V2}{2(V1 - V2)}$$

for various values of $$\frac{V2}{V1}$$

are given in the following table and have been plotted in the curve of Figure 4.

| Percent $V2/V1$ | $V1+V2$ | $V1-V2$ | $\frac{V1+V2}{2(V1-V2)}$ |
|---|---|---|---|
| 0 | 1 | 1 | 0.5 |
| 5 | 1.05 | .95 | 0.552 |
| 10 | 1.1 | .9 | 0.611 |
| 15 | 1.15 | .85 | 0.677 |
| 20 | 1.2 | .8 | 0.75 |
| 25 | 1.25 | .75 | 0.834 |
| 30 | 1.3 | .7 | 0.929 |
| 35 | 1.35 | .65 | 1.039 |
| 40 | 1.4 | .6 | 1.167 |
| 45 | 1.45 | .55 | 1.319 |
| 50 | 1.5 | .5 | 1.5 |
| 55 | 1.55 | .45 | 1.722 |
| 60 | 1.6 | .4 | 2.0 |
| 65 | 1.65 | .35 | 2.36 |
| 70 | 1.7 | .3 | 2.83 |
| 75 | 1.75 | .25 | 3.5 |
| 80 | 1.8 | .2 | 4.5 |
| 85 | 1.85 | .15 | 6.17 |
| 90 | 1.9 | .1 | 9.5 |
| 95 | 1.95 | .05 | 19.5 |
| 100 | 2 | 0 | ∞ |

It has been shown that, when two currents of nearly equal amplitudes but different in frequency are applied to the input of an effective amplitude limiter then the limiter output current will appear to be at a frequency intermediate the two input frequencies except for short high peak pulses of frequency deviation. (Figure 3.) These pulses of frequency deviation extend in the direction away from the frequency of the weaker current through and far beyond the frequency of the stronger current.

If the stronger current is fixed in frequency and the frequency of the weaker current varies the value of the peak frequency deviation is proportional to the difference between the two frequencies. Furthermore, the direction of the peak frequency deviation pulse reverses as the frequency of the weaker current passes through the frequency of the stronger current. The value of the deviation also passes through zero as the weaker current frequency passes through the stronger current frequency. Obviously a somewhat similar effect exists if the weaker current frequency remains fixed but the frequency of the stronger current is varied. Since the direction and the value of the frequency deviation pulse is controlled by the relation between the frequencies of the stronger and weaker currents the deviation pulse may be employed as a means for indicating relative frequencies.

Figure 5:
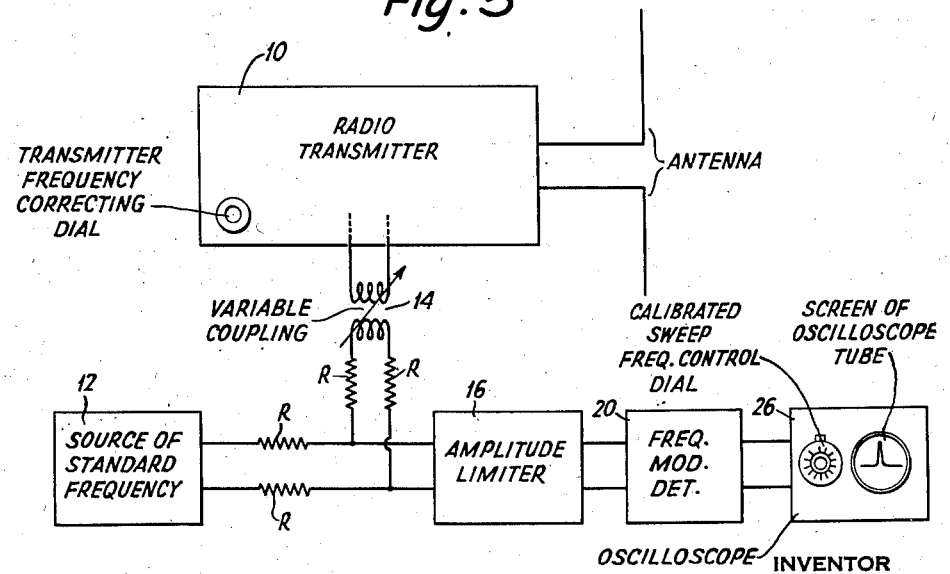
Figure 5 is a block diagram illustrating a wave frequency variation detecting means arranged in accordance with my invention.

In Figure 5 I have illustrated by block diagram means for detecting frequency deviations of current. In this arrangement current from the transmitter 10 and current from the source 12 of standard frequency are supplied by way of a variable coupling 14 and uncoupling resistances R to an amplitude limiter 16. The output from the limiter 16 is passed into a frequency modulation detector 20. In the output from the detector the wave form of output current will be of the same character as that indicated in Figure 3 and the peaks will correspond to upward or downward frequency deviations depending upon whether or not the frequency of the weaker current is respectively below or above the frequency of the stronger current. The current from 10 is preferably weaker than the current from 12. The wave frequency demodulator 20 preferably is of an approved type such as shown by Crosby in his Patents #2,229,640 and #2,230,212, by George in his Patent Re. #21,473, by Seeley in his Patent #2,121,103, by Conrad in his Patent #2,057,640, or by me in my Patents #1,803,504, #1,813,922, #1,819,508, #1,867,567, #1,922,290, and #1,938,657.

The detector output current, amplified if necessary, may be applied to a cathode ray oscilloscope 26 and the wave form observed directly. The direction of the peaks, up or down on the oscilloscope screen according to polarity of connections, and the amplitude of the peaks for any given apparatus adjustment or the frequency of the peaks provide a measure of the frequency difference between the two currents and the direction of this difference.

Therefore, to monitor the frequency of the radio transmitter 10, for example, which frequency is intended to be equal to, or have a fixed relation to, a source 12 of a standard frequency current I simply pass a current from the standard frequency source 12 and a slightly weaker current from the transmitter 10 through the amplitude limiter 16 and a frequency modulation detector 20 to an oscilloscope with calibrated variable sweep frequency. Then the direction of the peaks, up or down on the oscilloscope screen, will indicate whether or not the transmitter frequency is above or below the frequency of the standard source while the oscilloscope sweep frequency to produce one cycle of wave on the screen, or this frequency times the number of cycles on the screen, will be a direct measure of the difference in frequency between the transmitter and the standard source.

In operating the frequency comparison system just described a variable coupling 14 from the transmitter to the limiter input is provided. Then an operator, by bringing the coupling up from zero until sufficient peaking is apparent, but the direction of peaking is not reversed, may assure that the transmitter current is the weaker current into the limiter. Alternatively I employ any one of many possible automatic means, including limiters and automatic volume control arrangements, to assure that, over a large range of input power from the transmitter 10 a substantially constant power input to the limiter 16 is obtained which is slightly less than the power obtained from the standard frequency source 12.

Having a means for detecting the direction and amounts of variations of the transmitter frequency from that of the standard source an operator may make manual corrections in transmitter frequency to make it almost exactly equal to the frequency of the standard source, or to make it have some desired relation to it.

In an automatic system one of the first requirements is that the portion of current whose frequency is to be controlled always be weaker, but preferably only a little weaker, in the input to the limiter, than the current from the standard frequency source. Of course the strength of current taken from the transmitter may be initially adjusted to a correct value and often this adjustment will be maintained well enough for practical purposes due to constant power level in the transmitter at the point from which the current is derived. In other cases where the power level in the transmitter is variable or variations take place in the strength of current taken from the standard source there is need of some form of automatic current ratio control.

In such cases there is need of a system which operates automatically so that it is not necessary to have an operator to observe and correct the frequency through manipulation and observation. In these cases a system such as that illustrated in Figure 6 is employed.

In Figure 6 I have shown an automatic transmitter frequency correcting system in which variations in radio frequency power delivered to the monitoring equipment from the transmitter 10 automatically varies the power delivered from the standard frequency source 12 to hold a substantially constant ratio between the two currents in the input to the limiter 16. In this arrangement an increase in alternating-current power and voltage coming from circuit 14 coupled to the transmitter 10 will increase a direct current and potential in the output of rectifier 19 and this increased current and potential changes the electrode potentials of amplifier vacuum tubes in 15 to increase their gain. With this system properly arranged and adjusted the ratio of strengths of the two currents in the input to the limiter 16 is held sufficiently constant over a large range of input strength derived from the transmitter.

The two currents of regulated ratio are then passed through the amplitude limiter 16 to a frequency modulation detector 20 followed by a rectifier in which two rectifying elements pass currents with opposite polarities of output from the frequency modulation detector. That is, if the peaks are in one direction in the frequency modulation detector output current one rectifier will carry most current while if the peaks are reversed, the other rectifier will carry the most current.

The output currents from the two rectifiers are combined differentially into a resultant current which reverses in direction when the transmitter frequency is moved through the frequency of the standard source. Also the value of the resultant current, in either direction, increases about in proportion to the difference in frequency between the transmitter and the standard source, over a large range. The resultant current, of polarity and magnitude depending upon the relative frequencies of transmitter and the standard source, is then supplied by lines 30 and utilized to correct the transmitter frequency and thereby to hold it equal to, or in some fixed relation to, the standard source.

The device for correcting the transmitter frequency under control of the reversible and variable direct current may be a relay and reversible motor for varying the frequency of the transmitter master oscillator, a motor operated reversibly and directly from the reversing current or some form of frequency modulator, acting on the transmitter, which is capable of response down to 0 frequency, or direct current. For example, a transmitter and stabilizing means such as disclosed in Crosby U. S. application #136,578, filed April 13, 1937 is well suited for use here, as is the means of my Patents #2,207,540 and #2,104,801.

When two currents which are constant in frequency, but different in frequency, have variable relative amplitudes my means is useful for detecting the changes in relative amplitudes by supplying arbitrary portions of the two currents to an amplitude limiter followed by a frequency modulation detector and an indicator such as a cathode ray oscilloscope. The direction of the sharp frequency change pulses in the output of the limiter reverse when the ratio of amplitudes of the two currents going into the limiter is reversed. Such an arrangement is similar to that shown in Figure 5 when the coupling 14 supplies a constant frequency current the amplitude of which is variable in the input to the limiter 16.

Therefore the amplitudes of the two currents going into the limiter may be adjusted manually to be substantially equal as indicated by the point of reversal of the frequency change peaks. Likewise the reversing direction of the peaks is utilized to make automatic relative amplitude corrections by means of a system very similar to that described for automatic frequency correction.

Figure 11:
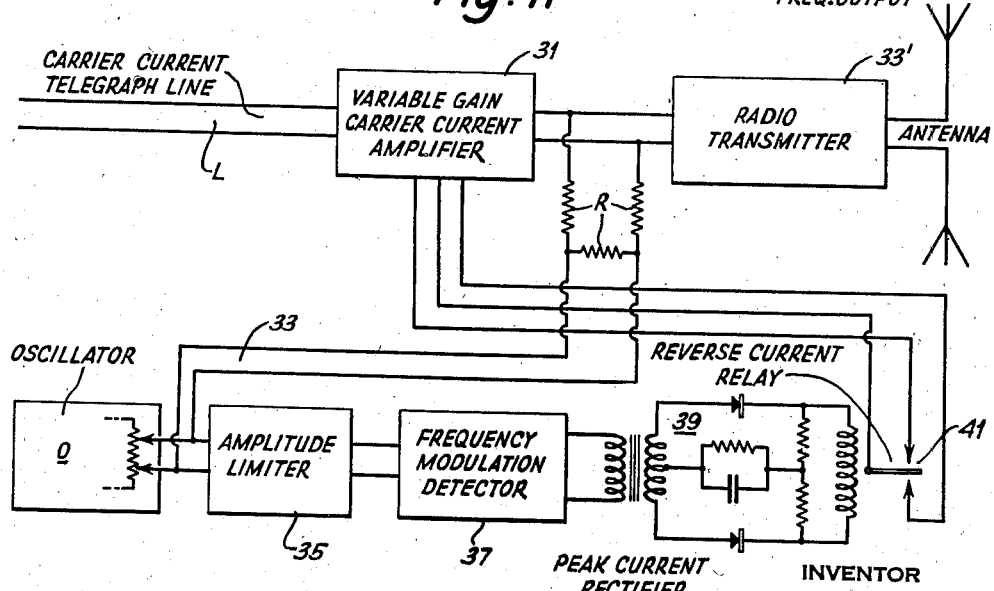
Figure 11 illustrates a novel telegraphy system including means for reducing the effect of keyed wave attenuation on the transmitter which uses the principle of my invention as described above.

To illustrate a system employing automatic amplitude correction reference may be made to Figure 11 in which I have shown a system for controlling the strength of input from a carrier current telegraph line to a radio transmitter which is keyed or modulated by the carrier current.

It has been found in practice that when carrier currents are transmitted for considerable distances for carrying signals between central traffic offices and radio stations, frequent difficulties are encountered due to variations in the strength of the carrier current delivered over the line. In the case of keyed audio frequency carrier currents these variations are very hard to correct by known automatic volume control systems because of lack of continuity of the current and variations in the percentage time on and off as well as the effects of noise. In fact, the only practical automatic volume control scheme in these circumstances has been one in which one of a number of channels through one cable has been set aside to carry a continuous pilot channel current to operate a common volume control system acting on all channels. The arrangement of Figure 11 is capable of controlling the amplitude of a single channel keyed carrier current.

In the arrangement of Figure 11 a carrier current telegraph line L delivers keyed signals to a variable gain carrier current amplifier 31, and from there to a radio transmitter 33'. A portion of the amplified carrier current is supplied by lines 33 to an amplitude limiter 35 and combined with current from a local oscillator O in the input of said amplitude limiter 35 which is followed successively by a frequency modulation detector 37, a peak current rectifier 39 and a reverse current relay 41. The relay in turn controls the gain of the variable gain carrier current amplifier 31, preferably through a small reversible motor which runs only when one of the relay contacts is closed.

The oscillator O is set at a frequency somewhat different from the carrier telegraph current frequency and at an amplitude corresponding to the amplitude of telegraph carrier current desired at the input to the limiter 35, which bears a fixed relation to the telegraph carrier current input to the transmitter 33'.

As a result of the two input currents to the amplitude limiter 35 there will exist in the output from the limiter a new current having a frequency equal to that of the stronger of the two input currents and this current will be phase or frequency modulated due to the weaker input current.

It will be apparent that, if the strength of amplified carrier telegraph current in the input to the limiter 35 is above that from the local oscillator O then it will determine the center frequency delivered to the frequency modulation detector. On the other hand, if it is below the current from the local oscillator then the oscillator current will determine the center frequency. Furthermore, the center frequency switches more or less abruptly from one value to the other as the amplitude of the carrier telegraph component of current moves above or below that of the local oscillator current.

If we assume that the carrier telegraph current is one which is on continuously, such as would be used for frequency modulated subcarrier communication, then by adjusting the frequency modulation detector for a center frequency between the frequencies of the carrier telegraph current and the oscillator current I obtain from the detector a direct current which reverses polarity as the two limiter input currents pass through equal amplitudes. This reversal of current is utilized to operate the reverse current relay 41 to operate the automatic gain control motor in the variable gain carrier current amplifier 31.

However, in the system of Figure 11, where it is assumed that the carrier current is discontinuous, an alternating current is taken from the frequency modulation detector 37 and applied to a peak current rectifier 39. As explained in connection with Figures 1, 2, 3 and 4 the alternating current wave form is distorted unsymmetrically and shows high peaks in one polarity but not the other. The polarity of these peaks reverses abruptly as the strength of one limiter input current moves above or below the strength of the other.

These unsymmetrical peaks cause the peak current rectifier 39 to provide a direct current output to the relay 41 which reverses as the strength of the carrier telegraph current changes from too high to too low, and vice versa. The relay 41, in turn, controls the gain of the amplifier 31 to hold substantial equality between the two currents going into the limiter 35. This, in turn, fixes the volume of input to the transmitter 33'. The volume may be adjusted by adjusting the strength of current from the local oscillator O in the input to the limiter 35, or by adjusting the percentage of amplifier output power delivered by line 33 to the limiter 35.

When the carrier telegraph current is interrupted the alternating current out of the frequency modulation detector 39 stops and the relay 41 tends to return to a neutral or open circuit position. Noise on the line has relatively little effect upon the operation of the system.

The reversing direction of the peak frequency swing pulses when the predominance in relative amplitudes of two currents going into the limiter is reversed may be utilized as a means to control an automatic switching system for choosing either the stronger or the weaker current for utilization. It may, for example, be used to operate an automatic switcher in a diversity receiving system for the purpose of choosing the received signal with strongest carrier to provide the output from a receiver. The switching may be made almost instantaneous, which may have some advantages in comparison with a system using a common automatic volume control, such as has been used before.

In Figure 9 I have shown a diversity receiving system which makes use of the reversal of peak frequency swing pulses when the ratio of two signal carrier currents passes through unity. The figure shows two spaced antennas 40 and 40' which deliver signal currents to two receivers. These currents have unlike fading characteristics. That is, both currents vary in strength but the variations are not alike so that, at almost any particular time, one current will be stronger than the other. Beverage and Peterson in their Patents #1,819,589, dated August 18, 1931, #1,874,866, dated August 30, 1932, and #1,987,889, dated January 15, 1935, have shown that for short wave reception via the ionosphere, the strongest current not only has better signal-to-noise ratio but also has the best quality of received modulation. It is therefore desirable to take only the modulation energy from the diversity receiving system which has been derived from the strongest received carrier current.

Both carrier currents, derived from the same transmitted carrier current, are heterodyned in 42 and 42' to intermediate frequency currents, which are then passed through amplitude limiters 46 and 46' and electronic switcher amplifier and phase modulation detectors 48 and 48'. The two intermediate frequency currents are made different in frequency, preferably by an amount somewhat greater than the highest useful modulation frequency. They may differ, for example, by 20,000 cycles per second.

A portion of each of the two intermediate frequency currents is taken out and the two portions are combined in lines 50, passed through an amplitude limiter 54 and a frequency modulation detector 56. In the output from the frequency modulation detector 56 appears peak pulses at a rate of 20,000 per second. The polarities of these pulses reverses when the predominance of one intermediate frequency over the other reverses. That is, the polarity of the pulses depends upon which of the two antennas is receiving the stronger signal carrier.

The reversible pulse polarity is utilized to operate a tripping circuit 58 in the output of which positive potential appears on one or the other of two leads 60 and 62, depending upon the polarity of pulses out of the frequency modulation detector 56. Lead 64 is a common output lead. The tripping circuit is preferably as described in Finch Patent #1,844,950, dated February 16, 1932. The potentials on the output leads of the tripping circuit are utilized in switches 48 and 48' to turn on and off the functioning of portions of the two receivers associated with the two antennas. The switchers in 48 and 48' may be of the electronic type wherein an amplifier tube or tubes are controlled by the tripping circuit output to amplify and pass applied voltage or to block off the same. As an example of this type electronic switcher see Roys et al. Patent #2,089,430.

In operation of the system only the receiver with strongest input provides the useful output. If the relative strengths of currents to the receivers reverse then the reversal of polarities of the peak pulses causes the tripping circuit 58 to switch the output current from one tube thereof to the other and operate through means in 48 and 48' to switch the output from one receiver to the other, almost instantly. There will never be any appreciable time when both receivers supply output.

Because of the extreme sensitivity of the direction of pulses to relative current strengths a very delicate but positive control is provided for switching the useful output to the receiver with strongest input current.

If we employ a superheterodyne receiver in which signal currents are combined with substantially equal amplitude local oscillator currents, in the input to a limiter, followed by a frequency modulation detector, then in the output from the detector will appear pulses having a frequency equal to the difference between the frequencies of the signal current and the local oscillator current. These pulses may then be utilized directly, rectified or beat down to a still lower frequency according to the type of signaling and the system employed.

I have illustrated one such receiver in Figure 7. In this figure received high frequency energy from antenna 80 is beat down in first detector 82 to an intermediate frequency, being also amplified, in accordance with ordinary superheterodyne receiver practice. Intermediate frequency signal current is then combined in leads 84 with an intermediate frequency second oscillator current from source 86 of substantially equal amplitude. The combined currents are then passed through an amplifier and amplitude limiter 88 to a wide band frequency modulation detector 90. Out of the detector will be obtained pulses of high peak value recurring at a rate corresponding to the difference in frequency between the signal intermediate frequency and the second heterodyne oscillator frequency. These high peak pulses are then rectified in 92 to provide a final receiver output signal.

If the signal to be received is an on-off keyed telegraph signal of fixed amplitude then the final receiver output is keyed on and off by the signal. The output signal is relatively sensitive to the received signal amplitude and tends to disappear if the received signal goes much above or much below the normal amplitude. That is, if the received signal is adjusted to some low amplitude and then gradually increased the output signal appears rather suddenly at the normal amplitude and then disappears rather suddenly for higher amplitudes. Maximum receiver output is obtained when the signal first intermediate frequency energy is substantially equal to the second heterodyne oscillator energy in the input to the limiter. In Figure 8, I have shown the type of amplitude response which the receiver has. The sharpness of the peak of receiver output depends upon the band width of the limiter and frequency modulation detector 90 as well as upon the characteristics of the rectifier 92 and its output circuits. In general, the broader the band width of the limiter and frequency modulation detector is made and the higher the output impedance of the rectifier the greater will be the output peaking when the two currents into the limiter are nearly equal.

If noise enters with the useful signal current its effect is to increase or decrease the strength of current combined with the second heterodyne oscillator current in the input to the limiter. If the useful signal alone produced substantially maximum receiver output then the presence of any great amount of noise can only reduce the receiver output. A peak of ignition noise of a strength many times greater than the useful signal will momentarily reduce the receiver output nearly to zero, or all the way to zero if the rectifier output circuits are provided with some fixed potential which must be exceeded before rectifier current flows. Therefore the system of Figure 7 provides a form of automatic noise suppression which may be very useful for some purposes.

The receiver of Figure 7 may be used for amplitude modulated telephony and signaling as well as for on-off telegraphy provided the percentage modulation of the carrier wave is not too great and provided the carrier amplitude is set on the side of the input versus output curve shown in Figure 8. It will be apparent that the polarity of receiver output may be reversed by reversing the amplitude ratios of the signal carrier and second heterodyne oscillator energy in the input to the limiter 88. In receiving amplitude modulation the percentage modulation at the transmitter should be kept small unless carrier exaltation is added to the receiver.

If the peak current rectifier is replaced by another frequency modulation detector, adjusted to cover a range of input pulse frequencies then the receiver of Figure 7 may be used to receive frequency modulated signals. I have described in my United States Patent #1,813,922 several forms of detectors for deriving currents proportional to the rate of repetition of short pulses.

As far as I am aware it has been assumed for a long time to be impractical to receive signal modulations transmitted by radiating both side bands of a modulated carrier current but with the carrier current itself suppressed. The nearest approach to double side band suppressed carrier communication has been systems in which the carrier is transmitted with reduced amplitude with respect to the side frequency currents after which the relative carrier amplitude is increased again in the receiver.

Figure 10:
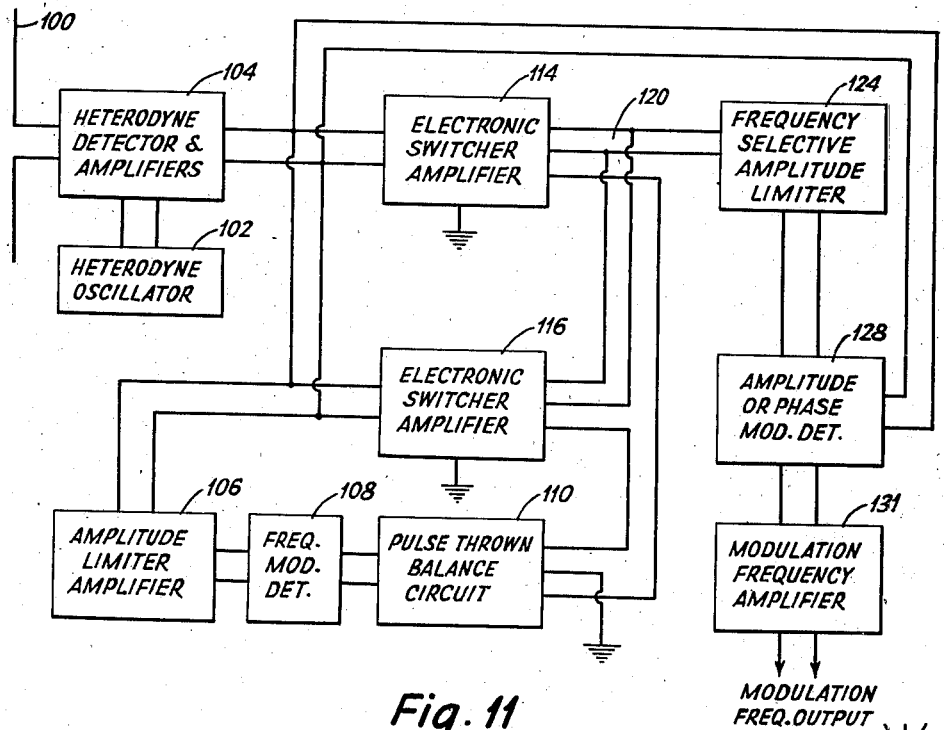

In Figure 10 I have shown an arrangement for receiving amplifying and demodulating double side band suppressed carrier signals, which makes this kind of communication possible. The phenomenon taking place in limiters, which has been described in detail above is used to make double side band reception possible.

In Figure 10 I have shown a receiving system in which double side band currents picked up on antenna 100 are first heterodyned, against current from 102 in first detector 104, to an intermediate frequency which is also amplified in the process. Some of the intermediate frequency current is taken to an amplitude limiter and amplifier 106 and passed through it to a frequency modulation detector 108. In the output of the frequency modulation detector will appear pulses which occur at the times of zero envelope amplitude of the double side band currents, at which times the phase of the combined double side band currents suddenly reverses.

The pulses in the output of the frequency modulation detector are utilized to operate a pulse thrown balance circuit 110. This is a circuit arrangement in which output potentials reverse polarity almost instantly when pulses of one polarity are applied to the input. Circuits to perform this pulse controlled switching function are shown in Ranger Patents #1,717,624, dated June 18, 1929, and #1,873,785, dated August 23, 1932. See also Sholkin Patent #1,962,467, dated June 12, 1934. A modified tripping circuit of the type disclosed in Finch Patent #1,844,950 may be used.

The pulse controlled reversing potentials from the pulse thrown balance circuit 110 are used to control the operation of two electronic switcher amplifiers 114 and 116 to make first one and then the other active. These electronic switcher amplifiers which may be of the type described above in connection with Figure 9 of the drawings and which utilize part of the intermediate frequency energy, are connected to a common output circuit 120 with reversed polarities. Consequently, when the pulse thrown circuit 110 is operated by the sudden polarity reversal of current in the frequency modulation detector 108 the electronic switching amplifiers 114 and 116 function to keep the phase reversal from appearing in their common output circuit.

Then, in the common output circuit, will appear a current, without polarity reversal, which is equivalent in frequency and phase to the carrier current which was suppressed at the transmitter. This new carrier current is passed through frequency selective circuits and an amplitude limiter in 124 to take out any trace of transient disturbances due to the switching. Thus a new conditioned carrier current has been provided, by means of the double side band currents, which has correct relative frequency and phase.

The new conditioned carrier current is then combined with a portion of the original double side band intermediate frequency current with correct phase in a detector 128 to produce a resultant amplitude or phase modulation current which may be detected in the usual way in 128 to provide modulation frequency output currents for amplification in 131.

Therefore, it seems to me, I have shown, for the first time, a means for accomplishing the long sought means for reception of modulations transmitted by means of double side band currents with suppressed carrier.

I claim:

1. In means for comparing the relative amplitudes of two alternating currents of unequal frequency, an amplitude limiter, means for applying the two currents to said amplitude limiter, means for relatively adjusting the amplitudes of the two currents to nearly equal but different values and means for deriving from said limiter a new current formed by interaction of the currents in the limiter.

2. In means for comparing the relative frequencies of two alternating currents, an amplitude limiter, means for applying the two currents to said amplitude limiter, means for causing the alternating currents so applied to have nearly equal but different intensities and means coupled to said limiter for deriving a new current formed by interaction of the currents in the limiter the modulations on which new current are characteristic of the relative frequencies of said alternating currents.

3. In means for comparing the relative amplitudes of two alternating currents of unequal frequency, an amplitude limiter, means for applying the said alternating currents to said amplitude limiter, means for causing the currents so applied to have nearly equal but different intensities, means for deriving a resulting current from the limiter and means for utilizing the wave form of phase or frequency modulation of the derived current.

4. Means for comparing the relative frequencies of two alternating currents comprising, means for relatively adjusting the amplitudes of said two currents to nearly equal but different amplitudes, an amplitude limiter coupled to said first means, means for applying the currents to said first means, means for deriving a resulting current from the limiter and means for utilizing the wave form of phase or frequency modulation of the derived current.

5. Means for indicating equality of amplitudes of two currents of unequal frequency comprising, an amplitude limiter, means for applying the currents to said amplitude limiter, means for deriving from the limiter a new phase or frequency modulated current resulting from the applied currents and means to indicate reversal of polarity of wave form distortions in the phase or frequency modulation.

6. Means for indicating equality of frequencies of two currents of unequal amplitudes comprising, an amplitude limiter, means for applying the currents to said amplitude limiter, means for deriving from the limiter a resulting phase or frequency modulated current and means to indicate reversal of wave form distortions in the phase or frequency modulation.

7. Means for indicating relative amplitudes of two currents of unequal frequency comprising, an amplitude limiter, means for applying the currents to said amplitude limiter, means for deriving a resulting phase or frequency modulated current from the limiter and means to indicate the polarity and amount of wave form distortion of the phase or frequency modulation.

8. Means for indicating relative frequencies of two currents of unequal amplitudes comprising an amplitude limiter, means for applying the two currents to said amplitude limiter, means for deriving a resulting phase and frequency modulated current from said limiter and means to indicate the polarity and amount of wave form distortion of the phase and frequency modulation.

9. In means for indicating relative amplitudes of two currents of unequal frequency one of which is of substantially constant amplitude, an amplitude limiter, means for applying portions of the two currents to said amplitude limiter, a frequency discriminator tuned to a frequency substantially equal to one half the sum of the frequencies of said two currents coupled to said amplitude limiter, and indicating means coupled to said frequency discriminator whereby it can be determined whether or not the mean frequency of the resultant output current from the limiter is equal to the frequency of one or the other of the two input currents.

10. Means for indicating relative amplitudes of two currents of unequal frequency comprising, an amplitude limiter, means for applying portions of the two currents to said amplitude limiter, a frequency modulation detector coupled to said limiter, and means for indicating the degree and polarity of wave form dissymmetry in the output from the detector.

11. In means for detecting variations in the frequency of wave energy, a source of wave energy of substantially fixed frequency, an amplitude limiter, means for impressing said wave energy of varying frequency and said wave energy of substantially fixed frequency on said limiter and a wave length modulation detector coupled to said limiter.

12. In means for detecting variations in the frequency of wave energy, a source of wave energy of substantially fixed frequency, and of an amplitude substantially the same as the amplitude of said first-named wave energy, means for impressing said wave energy of varying frequency and said wave energy of substantially fixed frequency on said limiter, and a wave length modulation detector coupled to said limiter.

13. Means for switching from one current source to another current source comprising, an amplitude limiter, means for applying two alternating currents of unequal frequencies and variable relative amplitudes to said amplitude limiter, a phase or frequency modulation detector coupled to said limiter and a pulse controlled switcher associated with said sources and excited by the output of said detector.

14. An amplitude sensitive receiver system comprising an amplitude limiter, means for combining a signaling current and approximately equal locally generated current in the input to said amplitude limiter, a phase or frequency modulation detector coupled to said limiter and a rectifier coupled to said detector.

15. In a receiver for carrier current of variable amplitude, means for providing maximum receiver output at one amplitude of signal input but less amplitude of receiver output for either less or greater signal amplitude including, an amplitude limiter, means for impressing said carrier current and other current of about like amplitude and of different frequency on said amplitude limiter, a frequency modulation detector coupled to said limiter and a peak rectifier coupled to said detector.

16. In means for switching the polarity of electrical currents, an amplitude limiter, means for applying two alternating currents of different frequency but of substantially equal amplitudes to said amplitude limiter, a frequency modulation detector coupled to said limiter and a pulse controlled switcher coupled to the output of said detector and excited by said currents.

17. In a diversity receiving system, a plurality of carrier wave receiving means, means for impressing received wave energy on said receiving means and means for deriving output from the receiving means with strongest carrier input comprising an amplitude limiter coupled to at least two of said receiving means, a phase or frequency modulation detector coupled to said limiter and a pulse controlled switcher coupled to said receiving means and controlled by the output of said detector.

18. In a diversity receiving system, two carrier wave receivers, means for impressing carrier wave energy on said receivers and means for deriving output from the receiver having strongest carrier input comprising an amplitude limiter, means for applying portions of currents from each of two receivers to said amplitude limiter, a phase or frequency modulation detector coupled to said limiter and a pulse operated switcher coupled to said receivers and excited by the output of said detector for controlling the outputs from the receivers differentially.

19. In a receiver for signals transmitted by a double side band suppressed carrier transmitter, means for deriving a new carrier wave comprising a wave polarity switcher having an input excited by said double side band currents, said polarity switcher having an output, circuits including a detector excited by said double sideband currents for deriving pulses when the amplitude of the sidebands drops substantially to zero; and control means coupling said circuits to, said polarity switcher for switching the polarity of the wave energy in its output each time the vector sum of the side band currents passes through or close to zero to derive in said output of said polarity switcher a new carrier current.

20. In a receiver for double side band suppressed carrier waves, means for deriving a new carrier wave from the double side band waves comprising a polarity switcher having an input excited by said double side band waves, said polarity switcher having an output, and means controlling said polarity switcher to switch polarity of the output when the envelope of the double side band currents drops near zero, said last named means comprising an amplitude limiter having an input excited by said double sideband currents, said amplitude limiter having an output, a wave length demodulator coupled to said limiter output, a control circuit coupling said demodulator to said polarity switcher, and a frequency selective circuit and an amplitude limiter coupled to said polarity switcher to select and amplitude limit said new carrier.

21. A receiver according to claim 20 including means for combining the derived carrier current with double side band currents and means for demodulating the combined currents.

22. Means for detecting variations in the frequency of wave energy, a current amplitude limiter having input electrodes excited by said wave energy and having output electrodes, circuits for impressing other wave energy of substantially constant frequency on the input electrodes of said current amplitude limiter whereby a resultant, the frequency of which changes in accordance with said aforesaid variations, appears on said output electrodes, a wave length modulated wave demodulator having input electrodes coupled to the output electrodes of said current amplitude limiter, said demodulator having output electrodes and a utilization circuit coupled to the output electrodes of said demodulator.

23. In a system for producing potentials characteristic of the deviations in frequency of wave energy from a mean frequency, an alternating current amplitude limiter having input electrodes excited by said wave energy and having output electrodes, circuits for impressing other wave energy of substantially constant frequency on the input electrodes of said current amplitude limiter whereby a resultant, the frequency of which shifts in accordance with the aforesaid variations, appears on the output electrodes of said current limiter, a wave length modulated wave detector having an input coupled to the output of said current amplitude limiter, said detector having an output, and a peak rectifier having an input coupled to the output of said wave limiter and having an output coupled to signal utilizing means.

24. The method of converting wave length or wave amplitude modulations on wave energy into corresponding wave length modulations on wave energy which includes the following steps combining said modulated wave energy with wave energy of substantially fixed frequency, relatively adjusting the amplitudes of the wave energies as combined to nearly equal but different values and limiting said combined wave energies to derive a resultant, the mean frequency of which is substantially equal to the frequency of the stronger of said two wave energies and the variations of instantaneous frequency of which changes with changes in the relative amplitudes or frequencies of said wave energies.

25. The method of demodulating wave length or wave amplitude modulation on wave energy which includes these steps, combining said modulated wave energy with wave energy of substantially fixed frequency, relatively adjusting the amplitudes of the wave energies being combined to nearly like but different values, limiting said combined wave energies to produce a resultant the mean frequency of which is substantially equal to the frequency of the wave energy of greatest amplitude which resultant is modulated in accordance with the modulations on said firstmentioned wave energy, and subjecting said resultant to a frequency modulation detection or demodulation.

26. In a system for comparing the relative amplitudes or frequencies of alternating current waves, two wave energy sources, of which sources at least one is of substantially constant frequency and at least one is of substantially constant amplitude, a wave amplitude limiter having an input and an output, connections between the input of said limiter and both of said sources for impressing alternating current waves from both of said sources on the input of said limiter, amplitude adjusting means in said connections for relatively adjusting the amplitudes of the two alternating current waves to nearly equal but different values, and a wave length modulation detector coupled to the output of said limiter.

27. In a system for comparing the relative amplitudes of two alternating current waves, two wave energy sources of unlike frequency and nearly like but different amplitudes of which sources at least one is of substantially constant frequency and of substantially constant amplitude, a wave amplitude limiter having an input and an output, connections between the input of said limiter and both of said sources, and a wave length modulation detector tuned to a frequency equal to half the sum of the frequencies of the wave energies of said sources coupled to the output of said limiter.

28. In a system for comparing the relative frequencies of two alternating current waves, two wave energy sources of nearly like but different amplitudes of which sources at least one is of substantially constant frequency and the other of varying frequency, a wave amplitude limiter having an input and an output, connections between the input of said limiter and both of said sources, and a wave length modulation detector tuned to a frequency equal to half the sum of the mean frequencies of the energies of said two sources coupled to the output of said limiter.

29. The method of deriving from two currents having the same order of amplitudes and different frequencies, one of which currents is of substantially constant frequency, a third current the modulations of which are characteristic of the relative amplitudes and relative frequencies of said two currents, which includes combining said two currents and subjecting said two currents during combination to an amplitude limiting action, and selecting from the limited energy a resultant or third current the frequency of which is about half way between the frequencies of said two currents during most of the cycle of beats between the two currents but the mean frequency of which is the frequency of the stronger of said two currents.

30. In a system for comparing the relative amplitudes or relative frequencies of two alternating currents of different frequencies and of nearly like but different amplitudes of which currents at least one current is of substantially constant frequency and at least one current is of substantially constant amplitude, a wave amplitude limiter having an input and an output, connections for applying both of said currents to the input of said limiter, and a wave length modulation detector, tuned to substantially one-half the sum of the frequencies of the two alternating currents, coupled to the output of said limiter.

CLARENCE W. HANSELL.